United States Patent [19]

Ohtaka

[11] Patent Number: 4,864,325

[45] Date of Patent: Sep. 5, 1989

[54] PRINTING DEVICE

[75] Inventor: Yoshimitsu Ohtaka, Shizuoka, Japan

[73] Assignee: Tokyo Electric Co., Ltd., Tokyo, Japan

[21] Appl. No.: 170,233

[22] Filed: Mar. 18, 1988

[30] Foreign Application Priority Data

Mar. 24, 1987 [JP] Japan .................................. 62-69585

[51] Int. Cl.[4] .............................................. G01D 15/16

[52] U.S. Cl. .................................. 346/75; 346/140 R

[58] Field of Search ...................... 346/75, 140; 358/75

[56] References Cited

U.S. PATENT DOCUMENTS 3,763,308 10/1973 Miyata .................................. 358/75
3,950,967 4/1976 Davies .................................. 68/5 D
4,647,945 3/1987 Andeen ............................. 346/75 X

*Primary Examiner*—Joseph W. Hartary

*Attorney, Agent, or Firm*—Oblon, Fisher, Spivak, McClelland & Maier

[57] ABSTRACT

The present invention provides a printing device wherein a sublimable dyestuff contained in a dyestuff case is heated to sublime to form steam of the dyestuff into which gas is flowed in order to pressurize the dyestuff steam to form pressurized dyestuff steam. A nozzle plate having a nozzle formed therein for jetting the pressurized dyestuff steam toward a record medium is communicated in a closing up relationship with the dyestuff case, and a valve for opening and closing the nozzle is provided at a deformable portion of a valve beam. An electrode plate is provided in an opposing relationship to the valve and in an isolated relationship from the valve and the pressurized dyestuff steam. The valve is displaced by an electrostatic force caused by a difference in potential between the valve and the electrode plate to close the nozzle. By selectively opening the nozzle, the pressurized dyestuff steam at a high pressure is jetted from the nozzle to effect printing.

23 Claims, 22 Drawing Sheets

PRINTING DEVICE

FIELD OF THE INVENTION AND RELATED ART STATEMENT

This invention relates to a printing device for printing a character or figure with a group of ink dots, and more particularly to a printing device of the type mentioned wherein a sublimable dyestuff is used for ink.

Conventionally, various types of printing devices exist wherein a character or figure is printed with a group of ink dots which are formed with solidified steam of a sublimable dyestuff produced by heating the dyestuff and jetted to a record medium.

Two exemplary ones of such printing device are disclosed in Japanese Patent Publication No. 56-2020. The printing devices are described now with reference to FIGS. 1 and 2. Referring first to FIG. 1, a printing device shown includes a charging electrode 4, a plurality of electrodes 5 and 6 and an electrostatic deflecting electrode 7 all located between a nozzle 2 containing a sublimable dyestuff 1 therein and a record medium 3, and as a heater 8 is energized, and sublimable dyestuff 1 is heated so that steam 9 of the dyestuff is jetted from the nozzle 2. The dyestuff steam 9 is then charged with electricity by the charging electrode 4 and thus caused to fly toward a back electrode 10 provided behind the record medium 3 with the quantity and direction of the dyestuff steam 9 controlled by the electrodes 5 and 6 and the electrostatic deflecting electrode 7. Thus, a required character or figure is drawn with the flow dyestuff steam 9.

Meanwhile, a printing device shown in FIG. 2 includes an electric field shutter 11 in place of the electrostatic deflecting electrode 7 of the printing device of FIG. 1. In the printing device of FIG. 2, the direction of dyestuff steam 9 is fixed while the quantity of the dyestuff steam 9 to be jetted toward a record medium 3 is controlled by the electric field shutter 11.

Different types of printing devices are disclosed in Japanese Patent Laid-Open No. 57-1771. In the printing devices, dyestuffs of a plurality of colors are heated in individual tanks to produce steam of the dyestuffs, and the steam of the multi-color dyestuffs is collected into a single stream and jetted from a single nozzle. One of such printing devices is shown in FIG. 3. In particular, sublimable dyestuff inks of four colors of yellow, cyan, magenta and black are supplied into an ink jet nozzle 14 via pipe conduits 13 by individual pressurizing means 12 such a pumps. There, the dyestuff inks are heated by individual heating means 15 such as nichrome wires so that they sublime into dyestuff steam. The dyestuff steam is excited by electromechanical converters 16 and then jetted as ink gas particles 18 from a single orifice 17 toward a record medium 19. In this instance, heating of the dyestuff steam is controlled by a heating signal generating device to control the quantities of the dyestuff steam to be produced for the different colors, and the color adjustment is thus made by mixing of the controlled quantities of the steam of the dyestuffs of the different colors.

A further type of printing device is disclosed in Japanese Patent Laid-Open No. 59-22759 and shown in FIG. 4. In particular, the printing device shown includes 3 sublimable dyestuff bars 21 of different colors mounted in a nozzle 20, and a laser beam source 22 and a lens 23 provided along the direction of an axis of the nozzle 20. An air system 24 is provided and is opened to the nozzle 20. The lens 23 is shifted so that a laser beam may be condensed and irradiated upon a desired one of the 3 color sublimable dyestuff bars 21 to produce steam of the dyestuff. The dyestuff steam thus produced is jetted from an end of the nozzle 20 by compressed air from the air system 24 so that it sticks to a record medium 25.

Problems of the conventional printing devices described above will now be described. At first, in the case of the arrangement disclosed in Japanese Patent Publication No. 56-2020 mentioned first, there is a problem that the flow rate of dyestuff steam jetted from the nozzle is low and the jetting speed is also low because the pressure of steam of the sublimable dyestuff is low. Further, a high temperature is required in order to raise the steam pressure of dyestuff steam, and a complicated device is required in order to attain such a high temperature. Besides, it is difficult itself to charge molecules of dyestuff steam with electricity without causing dissolution thereof in the atmospheric air.

Subsequently, in the case of the arrangement disclosed in Japanese Patent Laid-Open No. 57-1771, the ratio of the dyestuff included in a predetermined volume is low because the steam pressure of dyestuff steam is low. Accordingly, in order for the dyestuff to be jetted by an amount required for recording of a picture image, an electromechanical converter having a high air feeding capacity must be used, which makes the printing device complicated and expensive.

Further, in the case of the arrangement of Japanese Patent Laid-Open No. 59-22759, there is a problem that the printing device is expensive and complicated because an optical system must be provided while jetting of dyestuff steam by a sufficient amount can be attained by pressurization by the air system even if the steam pressure of dyestuff steam is low.

OBJECTS AND SUMMARY OF THE INVENTION

It is a first object of the present invention to provide a printing device wherein dyestuff steam can be jetted by a sufficiently high flow rate from a nozzle.

It is a second object of the present invention to provide a printing device which can print at a high speed.

It is a third object of the present invention to provide a printing device wherein the quality of printing can be made uniform.

It is a fourth object of the present invention to provide a printing device which is simple in structure.

It is a fifth object of the present invention to provide a printing device wherein the overall size can be reduced.

It is a sixth object of the present invention to provide a printing device wherein choking of a nozzle can be prevented.

It is a seventh object of the present invention to provide a printing device which is superior in durability.

In order to attain the objects, according to the present invention, there is provided a printing device, comprising a dyestuff case defining a dyestuff chamber for containing a sublimable dyestuff therein, a heating means for heating the sublimable dyestuff to sublime to form steam of the dyestuff, a pressurizing means for flowing gas into the dyestuff steam to pressurize the dyestuff steam to form pressurized dyestuff steam, a nozzle plate communicating in a closing up relationship with the dyestuff case and having a nozzle formed therein for jetting the pressurized dyestuff steam toward a record medium, a valve disposed in an opposing relationship to the nozzle for opening and closing the nozzle, a valve beam having a deformable portion which carries the valve thereon and moves, when deformed, the valve into or out of contact with the nozzle, and an electrode plate located in an opposing relationship to the valve and in an isolated relationship from the valve and the pressurized dyestuff steam for providing a difference in potential with reference to the valve to produce an electrostatic force relative to the valve to displace the valve toward the nozzle.

With the printing device, a voltage is applied between the electrode plate and the valve beam in response to a picture image signal, and when a picture point is to be formed, a predetermined gap is provided between the valve and the nozzle in order to permit the pressurized dyestuff steam to be jetted from the nozzle, but when a picture point is not to be formed, an electrostatic force is generated between the electrode plate and the valve beam to cause the valve to close the nozzle to interrupt jetting of the pressurized dyestuff steam. By controlling the electrostatic force between the electrode plate and the valve beam in this manner, jetting of the dyestuff steam from the nozzle is controlled to selectively form picture points on a record sheet to print a character or figure.

It is to be noted that since the electrode plate is provided in an isolated relationship from the valve and the pressurized dyestuff steam which presents a high pressure at a high temperature, the performance at an initial stage is maintained in use for a long period of time, and the printing device is superior in durability.

BRIEF DESCRIPTION OF THE DRAWINGS

FIG. 11 is a perspective view of a substrate;

FIG. 12 is a side elevational view of the substrate of FIG. 11;

FIG. 13 is a perspective view showing the substrate after completion of a nozzle pattern forming step;

FIG. 14 is a side elevational view of the substrate of FIG. 13;

FIG. 15 is a perspective view showing the substrate after completion of a nozzle plate forming step;

FIG. 16 is a vertical sectional side elevational view of the substrate of FIG. 15;

FIG. 17 is a perspective view showing the substrate after completion of a first insulator layer forming step;

FIG. 18 is a vertical sectional side elevational view of the substrate of FIG. 17;

FIG. 19 is a perspective view showing the substrate after completion of an electrode pattern forming step;

FIG. 20 is a vertical sectional side elevational view of the substrate of FIG. 19;

FIG. 21 is a perspective view showing the substrate after completion of an electrode plate forming step;

FIG. 22 is a vertical sectional side elevational view of the substrate of FIG. 21;

FIG. 23 is a perspective view showing the substrate after completion of a second insulator layer forming step;

FIG. 24 is a vertical sectional side elevational view of the substrate of FIG. 23;

FIG. 25 is a perspective view showing the substrate after completion of a spacer forming step;

FIG. 26 is a vertical sectional side elevational view of the substrate of FIG. 25;

FIG. 27 is a perspective view showing the substrate after completion of a valve beam pattern forming step;

FIG. 28 is a vertical sectional side elevational view of the substrate of FIG. 27;

FIG. 29 is a perspective view showing the substrate after completion of a valve beam forming step;

FIG. 30 is a vertical sectional side elevational view of the substrate of FIG. 29;

FIG. 31 is a perspective view showing the substrate after completion of a separating step;

FIG. 32 is a vertical sectional side elevational view of the substrate of FIG. 31;

DESCRIPTION OF THE PREFERRED EMBODIMENTS

Figure 1:
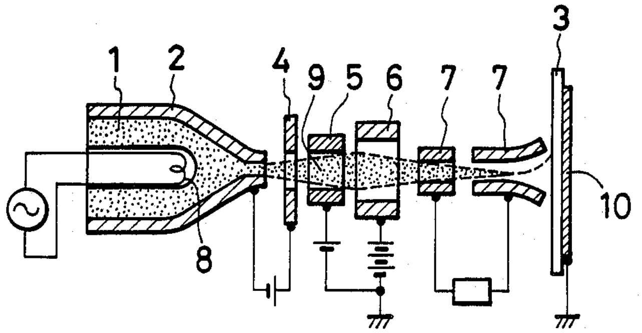
FIG. 1 PRIOR ART
FIG. 1 is a vertical sectional side elevational view showing an exemplary one of conventional printing devices.

A first preferred embodiment of the present invention will be described below with reference to FIGS. 5 to 34. In the present embodiment, a printing device is designed for color printing with 3 colors. The printing device includes a flattened body case 73, and a paper tray 71 provided at a rear portion of the body case 73 for receiving thereon a plurality of record sheets of paper 59 as record media. A discharging port 74 is provided at a front portion of the body case 73 for discharging such a paper sheet 59 therethrough. A discharge tray 75 is mounted adjacent the discharging port 74. Three jetting heads 45 are provided within the body case 73. The jetting heads 45 are generally of such a structure that dyestuff steam is jetted from a large number of nozzles 49 which are provided in an array over the entire width of the record sheet 59. More particularly, the jetting heads 45 are of a structure wherein a sublimable dyestuff 30 contained in a dyestuff case 26 is heated by a heater 29 serving as a heating means to provide steam of the dyestuff 30, and air is flowed into the dyestuff steam and is pressurized by a pressurizing pump 34 serving as a pressurizing means to produce pressurized dyestuff steam to be subsequently jetted from the nozzle 49. It is to be noted that each of the nozzles 49 is opened or closed by a valve 54 to control jetting of pressurized dyestuff steam. One of the jetting heads 45 serves as a head 68 for cyan, another one as a head 69 for yellow, and the remaining one as a head 70 for magenta, and the heads 68, 69 and 70 contain therein a sublimable dyestuffs 30 of the colors of cyan, yellow and magenta, respectively.

Subsequently, structures of the individual components will be described in detail. At first, the dyestuff case 26 includes a case 27 substantially in the form of a parallelepiped which is open at the top thereof, and a cap 28 for closing the top opening of the case 27, and thus defines a dyestuff chamber 26a therein. The heater 29 serving as a heating means is embedded in a bottom wall of the case 27, and a dyestuff cartridge 31 in which the sublimable dyestuff 30 in the solid state is filled is removably mounted in the case 27. The dyestuff cartridge 31 includes a cartridge body 76 in the form a casing in which the sublimable dyestuff 30 is contained, and a holding plate 77 having a large number of communicating holes 77a formed therein is placed on the sublimable dyestuff 30. An inflow port 32 is formed in a side wall of the case 27, and a filter 33 is mounted on the side wall of the case 27. The pressurizing pump 34 is connected to the filter 33. In particular, a yoke 35 is fixed by a fixing means not shown and includes a core 36 and a permanent magnet 37 provided thereon. The permanent magnet 37 is disposed around the centrally located core 36. A piston 39 having a coil 38 wound thereon is mounted for axial movement on the core 36 and fitted in a cylinder 40 connected to the filter 33. The cylinder 40 has provided thereon an inflow valve 41 in the form of a check valve for permitting gas to flow into the cylinder 40 from the outside, and an outflow valve 42 in the form of a check valve for permitting gas to be introduced from the cylinder 40 into the filter 33. A magnet valve 43 is interposed between the inflow valve 42 and the filter 33.

An inflow port 44 is formed in the bottom wall of the case 27 and communicated with a flow path 46 formed in a corresponding one of the jetting heads 45. The flow path 46 is formed from a jetting control valve 47 constituting the jetting head 45 and a vessel 48 secured to the jetting control valve 47. The sectional area of the flow path 46 is sufficiently great comparing with the area of an opening of a nozzle which will be hereinafter described. Therefore, the speed of dyestuff steam flowing in the flow path is relatively low, and accordingly the pressure loss is low. Further, even wherein a plurality of nozzles are involved, the pressure difference from the external air is constant for each nozzle, and the jetting characteristics are made uniform.

The jetting control valve 47 includes a nozzle plate 50 having formed therein a plurality of nozzles 49 each of which has a inner face of a spherical shape, an electrode plate 52 embedded in an insulator layer 51, a valve beam 55 having deformable portions 53 at which the valves 54 are formed, and a protective film 56 formed on the insulator layer 51.

The nozzle plate 50, valve beam 55 and electrode plate 52 are made of nickel which is superior in heat resisting property and also in dyestuff resisting property while the insulator layer 51 is made of polyimide which is superior in heat resisting property. The protective layer 56 is provided to protect the insulator layer 51 so that the polyimide may not be dyed by dyestuff steam at a high temperature which may deteriorate the insulation of the insulator layer 51, and a ceramic material such as $SiO_2$, $Al_2O_3$ or $Si_3N_4$ or a composition represented by any of these substances is used for the protective layer 56.

The valve beam 55 is in the form of a beam of the opposite end supported type, and each of the deformable portions 53 is formed in such a manner as to project in a direction perpendicular to the longitudinal direction of the valve beam 55 from a central portion of the valve beam 55. Besides, the deformable portion 53 is formed with a reduced thickness at portions near the opposite ends thereof so as to provide an elastic force by twisting and with the intention of assuring sufficient deformation of the deformable portion 53 by a low voltage.

Figure 33:
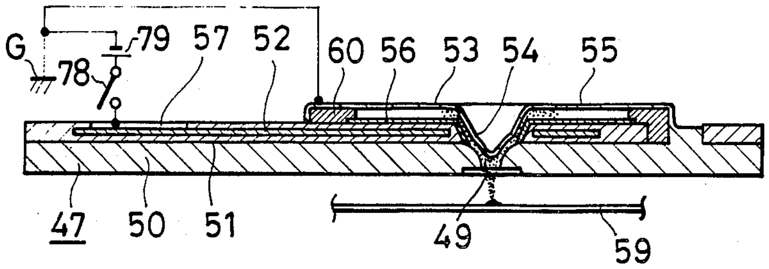
FIG. 33 is a vertical sectional side elevational view showing a nozzle in an open condition in which dyestuff steam is jetted therefrom.
Figure 34:
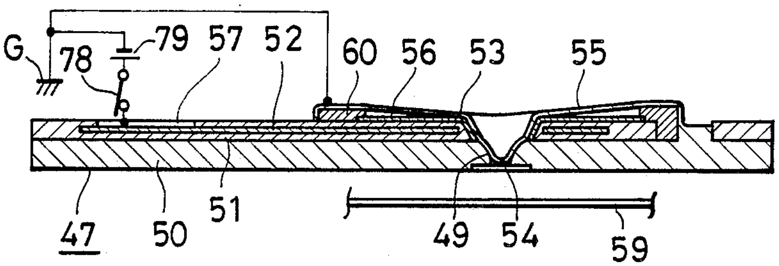
FIG. 34 is a vertical sectional side elevational view showing the nozzle in a closed condition.

The electrode plate 52 is connected to lead terminals 58 adjacent electrode plate taking out ports 57. The lead terminals 58 are led externally while maintaining the closing up of the flow path 46 and are connected to a positive side terminal of a driving power source 79 via a switch 78 as shown in FIGS. 33 and 34. The valve beam 55 is connected to the ground G outside while maintaining the closing up of the flow path 46. A negative side terminal of the driving power source 79 is connected to a junction between the valve beam 55 and the ground G.

It is to be noted that reference numeral 59 denotes a record sheet mentioned hereinabove.

Here, an example of process of producing the jetting control valve 47 will be described with reference to FIGS. 11 to 32. Since the following description with reference to FIGS. 11 to 32, however, is given mainly of a process of producing the jetting control valve 47, only general description will be given of any other component of the printing device. Therefore, a jetting control valve produced by the process of FIGS. 11 to 32 is shown different in configuration from the jetting control valve 47 of the present embodiment.

Figure 11:
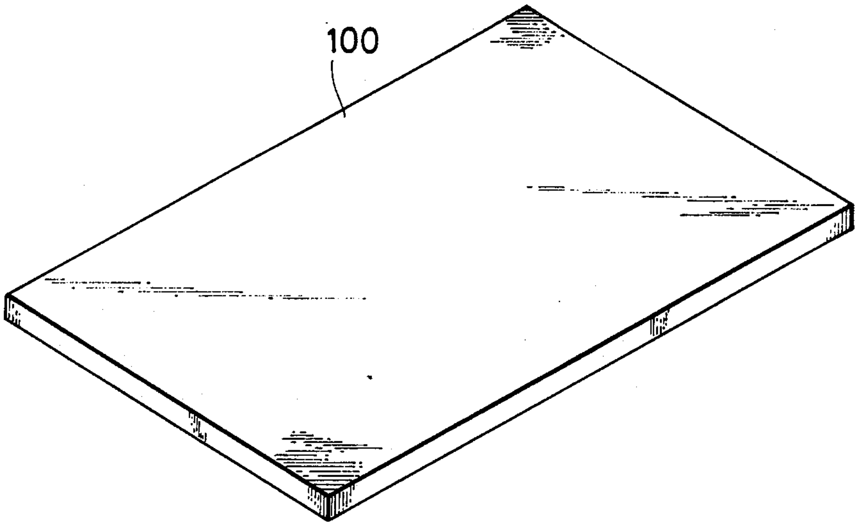
FIGS. 11 to 32 show an example of process of producing a jetting control valve.
Figure 12:
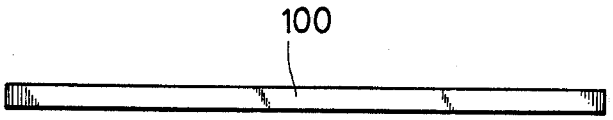

At first, such a substrate 100 as shown in FIGS. 11 and 12 is prepared. The substrate 100 is formed, for example, either from a metal plate such as a stainless steel plate the surface of which is finished into a surface of a mirror by polishing or from a glass plate which has a metal film formed on a surface thereof by a suitable means such as vapor deposition. The surface of the susbstrate 100 is preferably formed for a metal material which has a low adhering property to nickel. From this point of view, a stainless steel plate is suitable for the surface of the substrate 100.

Figure 13:
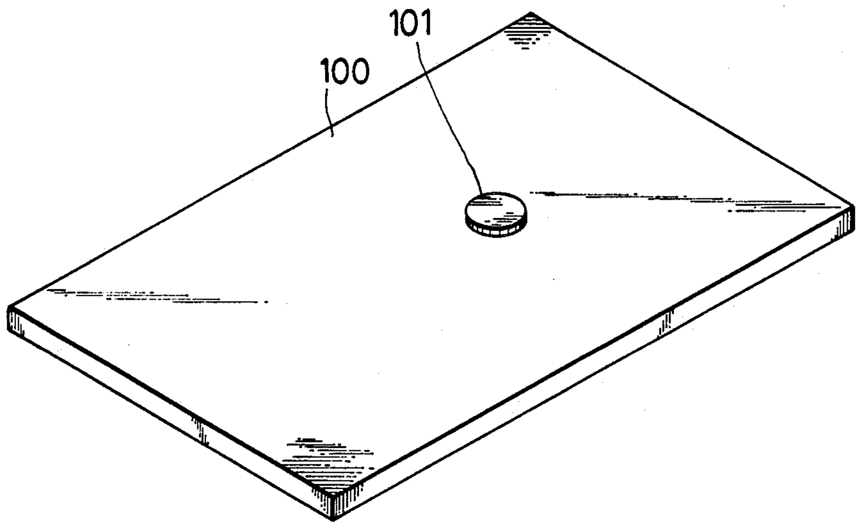
Figure 14:
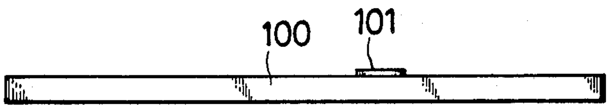

FIGS. 13 and 14 show the substrate 100 after it has passed a nozzle pattern forming step. At the step, a photo-resist layer 101 is formed on a surface of the substrate 100 and is exposed to light to effect development to form a pattern corresponding to a nozzle.

Figure 15:
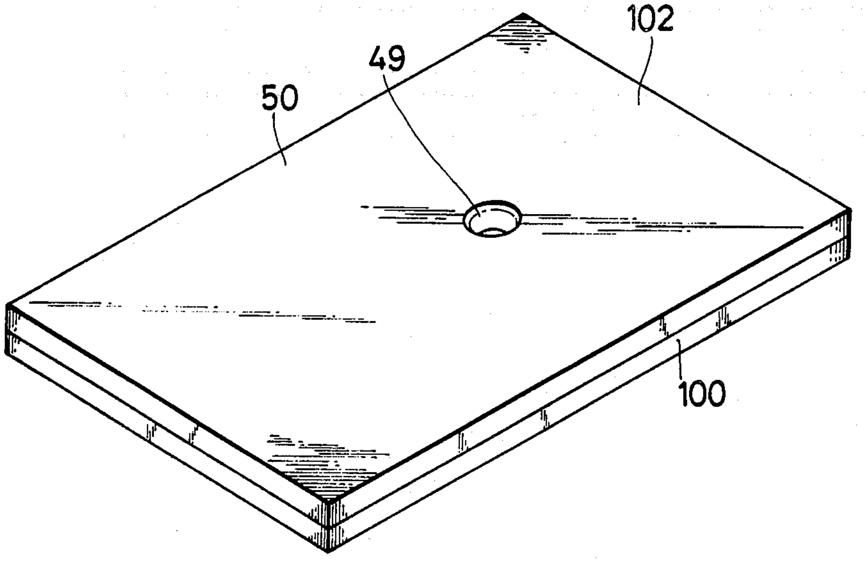
Figure 16:
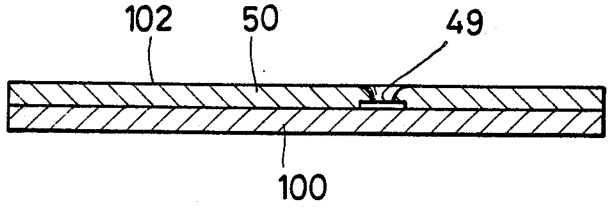

FIGS. 15 and 16 show the substrate 100 after it has further passed a first nozzle plate forming step. At the step, a metal film 102 is formed on the surface of the substrate 100 and the photo-resist layer 101 is removed to form a nozzle plate 50 which has a nozzle 49 formed therein. In this instance, since the metal film 102 covers over around the photo-resist layer 101, the nozzle 49 presents a trumpet-like configuration wherein the diameter thereof gradually increases toward a surface of the nozzle plate 50. It is a matter of course that the nozzle 49 corresponds to the location from which the photo-resist layer 101 is removed. The metal plate 102 is formed by nickel plating using a sulfamic acid nickel bath in order to improve the heat resisting property and the durability.

Figure 17:
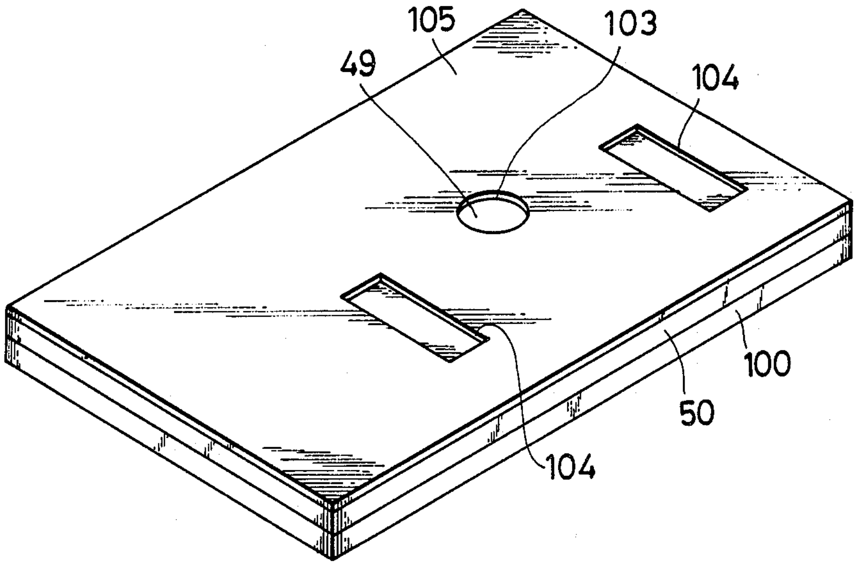
Figure 18:
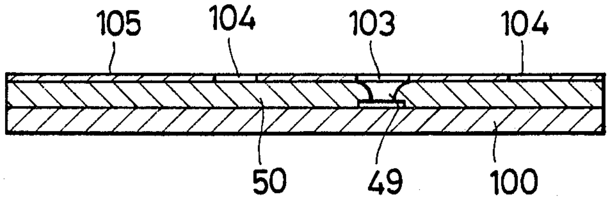

FIGS. 17 and 18 show the substrate 100 after it has further passed a first insulator layer forming step. At the step, a first insulator layer 105 is formed on a surface of the nozzle plate 50 such that an opening 103 and another pair of openings 104 are formed at a portion thereof corresponding to the nozzle 49 and at a pair of other predetermined portions thereof, respectively. The first insulator layer 105 is formed by forming a layer of photosensitive polyimide on the surface of the nozzle plate 50 and then by exposing the layer to light of a pattern for the openings 103 and 104 to effect development thereof. The thickness of the first insulator layer 105 is about 10 microns.

Figure 19:
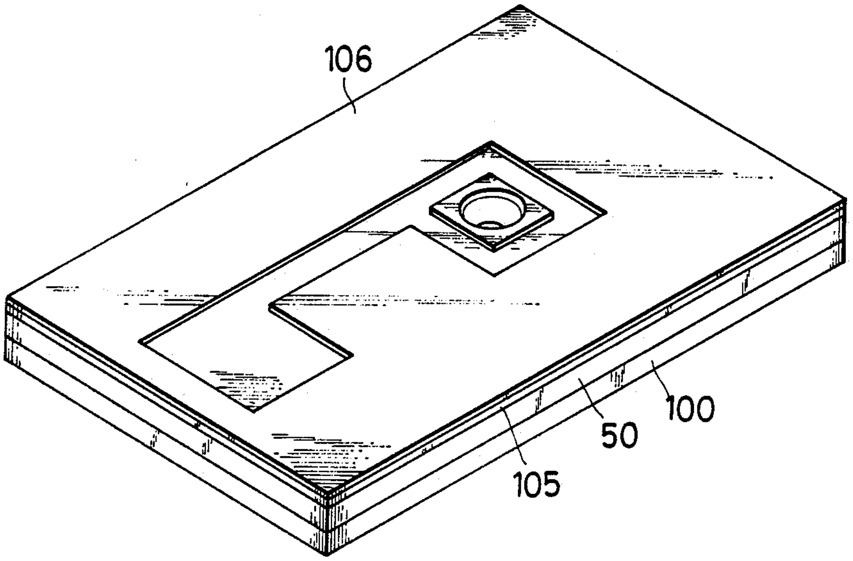
Figure 20:
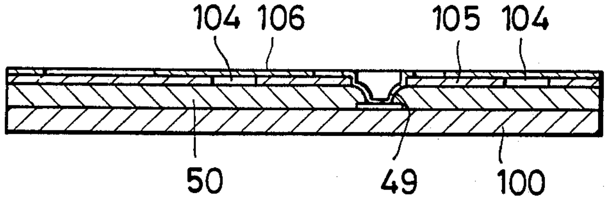

FIGS. 19 and 20 show the substrate 100 after it has further passed an electrode pattern forming step. At the step, a photo-resist layer 106 is formed on a surface of the first insulator layer 105 around a location opposing to the nozzle 49.

Figure 21:
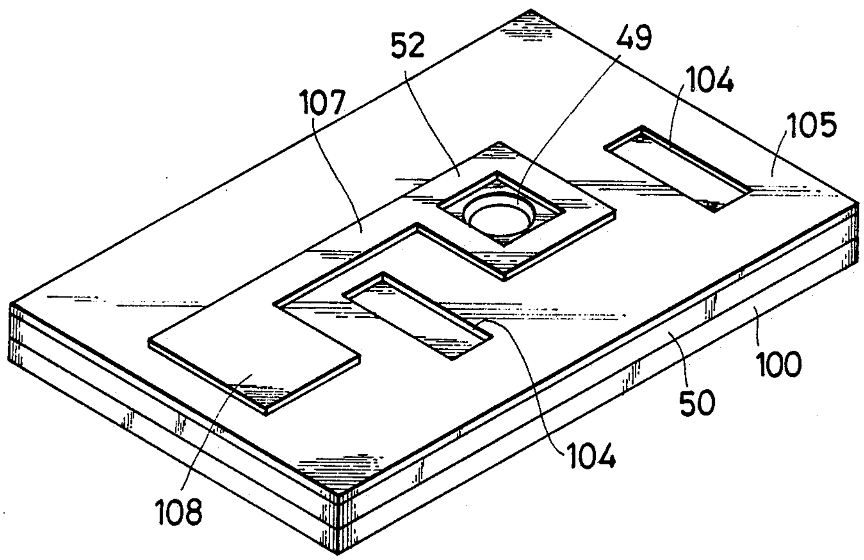
Figure 22:
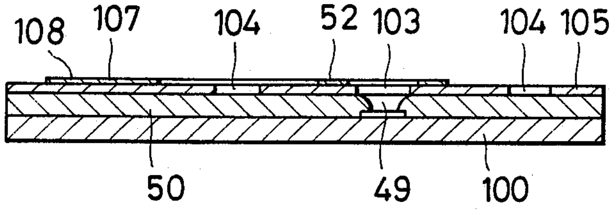

FIGS. 21 and 22 show the substrate 100 after it has further passed an electrode plate forming step. At the step, a metal film 107 is formed on a portion of the surface of the first insulator layer 105 on which the photo-resist layer 106 is not formed and then the photo-resist layer 106 is removed from the insulator layer 105 to form an electrode plate 52. A connecting portion 108 to be connected to the lead terminal 58 described above is formed at part of the electrode plate 52 and located at the electrode plate taking out port 57 described above. Since the metal film 107 is plated on the first insulator layer 105 which is an insulating substance, it is formed by non-electrolytic nickel plating to apply a conductive layer having a high adhering property to the first insulator layer 105 and then by nickel plating to prevent corrosion. It is to be noted that the latter nickel plating may be effected using a sulfamic acid nickel bath.

Figure 23:
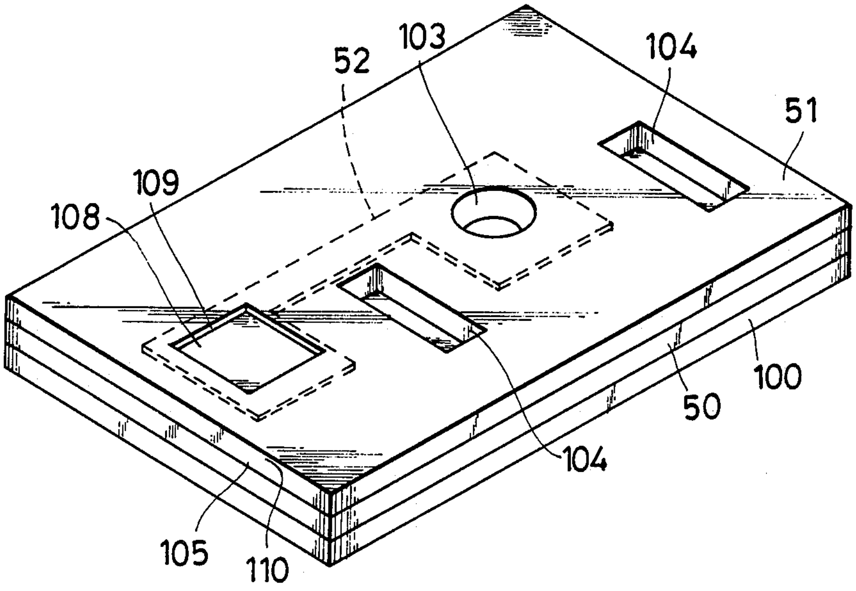
Figure 24:
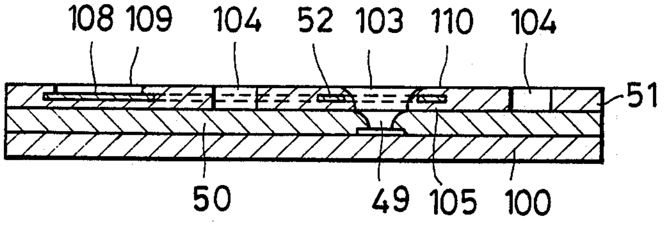

FIGS. 23 and 24 show the substrate 100 after it has further passed a second insulator layer forming step. At the step, a second insulator layer 110 is formed on the surfaces of the first insulator layer 105 and the electrode plate 52 such that openings 103 and 104 and an opening 109 may be formed in portions of the second insulator layer 110 corresponding to the openings 103 and 104 of the first insulator layer 105 and the connecting portion 108 of the electrode plate 52, respectively. The second insulator 110 has a thickness of about 10 microns. The second insulator layer 110 is formed by applying photosensitive polyimide in the liquid state to the surfaces of the first insulator layer 105 and the electrode plate 52 and then by exposing, after drying the polyimide layer to light of a pattern for the openings 103, 104 and 109 to effect development of the latter. After then, the second insulator layer 110 is heated so as to unite the same with the first insulator layer 105 to make the insulator layer 51.

Figure 25:
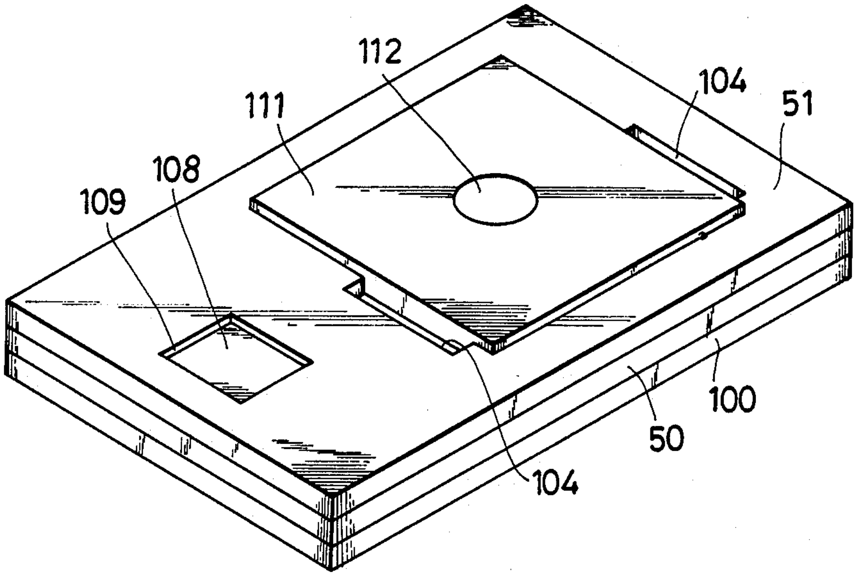
Figure 26:
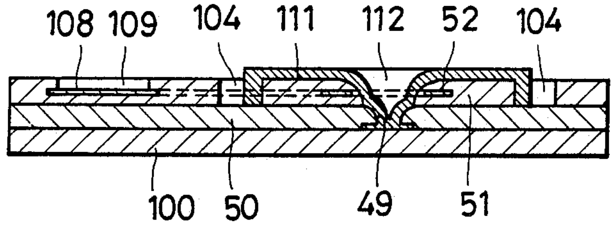

FIGS. 25 and 26 show the substrate 100 after it has further passed a spacer forming step. At the step, a spacer 111 is formed by sputtering copper on a surface of the insulator layer 51 including a location opposing to the nozzle 49 and an area around the location using a suitable masking. The thickness of the spacer 111 is about 20 microns. Accordingly, the spacer 111 is formed on a surface of the insulator layer 51 and inner faces of the nozzle 49 and the openings 103 and 104, and a recess 112 having a similar configuration to the inner face of the openings 103 is formed at a portion of the opening 103 of the spacer 111.

Figure 27:
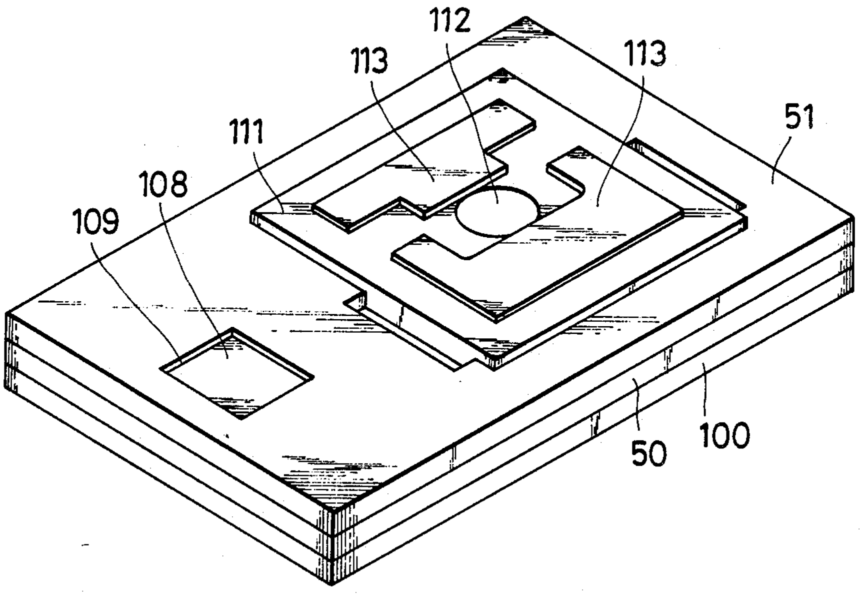
Figure 28:
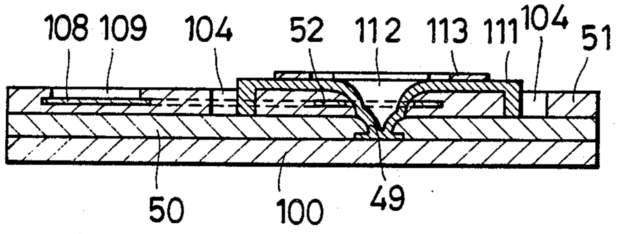

FIGS. 27 and 28 show the substrate 100 after it has further passed a valve beam pattern forming step. At the step, a photo-resist layer 113 is formed on a surface of a portion of the spacer 111 other than a portion opposing to the nozzle 49 (a portion opposing to the recess 112) and a peripheral portion of the spacer 111.

Figure 29:
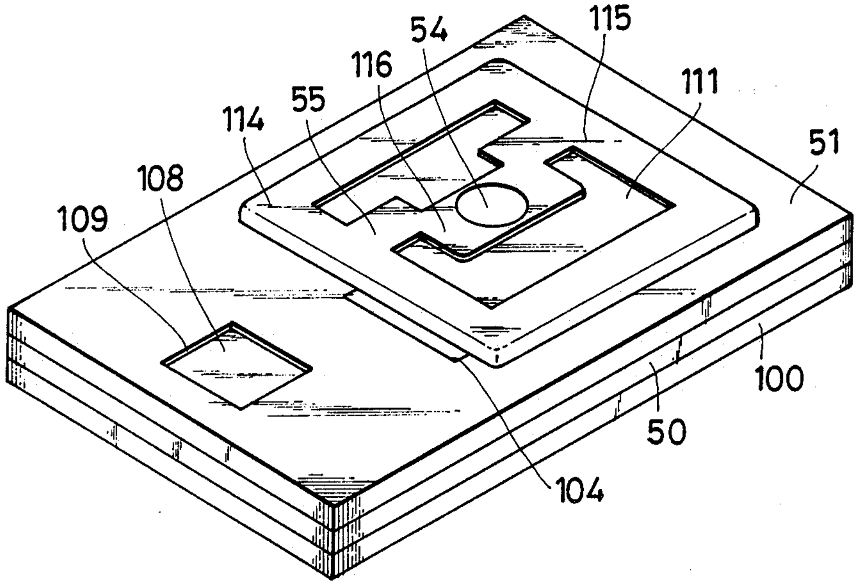
Figure 30:
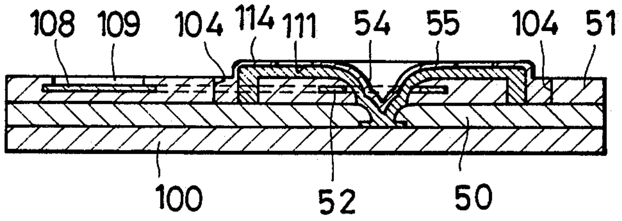

FIGS. 29 and 30 show the substrate 100 after it has further passed a valve beam forming step. At the step, a metal film 114 is formed on the portion of the surface of the spacer 111 on which the photo-resist layer 113 is not formed in order to form a support frame 115 of a square profile and a valve beam 55 which has opposite ends connected contiguously to the support frame 115. The thickness of the metal film 114 is about 10 microns. The metal film 114 is formed by nickel plating and is filled also in the openings 104. Accordingly, the opposite ends of the valve beam 55 are connected contiguously to the nozzle plate 50 by way of the support frame 115. Further, the valve beam 55 has a crank-like deformable portion 53 formed thereon which is projected in a direction perpendicular to the length thereof, and since the deformable portion 53 of the valve beam 55 is opposed to the recess 112, a valve 54 which extends along an inner face of the recess 112 is formed at the deformable portion 53.

Figure 31:
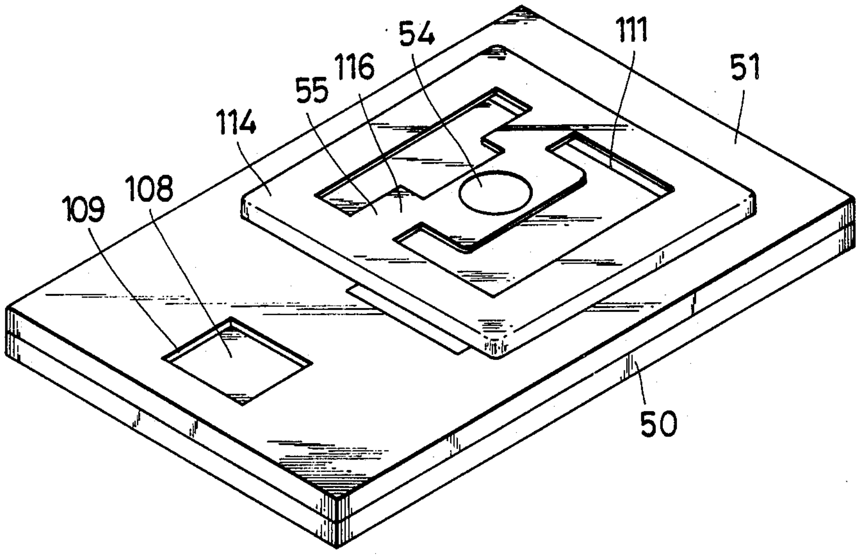
Figure 32:
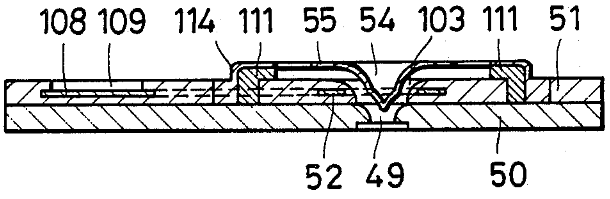

FIGS. 31 and 32 show a semi-completed jetting control valve after it has passed a separating step. At the step, a central portion of the spacer 111 is removed by etching, and the substrate 100 is exfoliated from the nozzle plate 50. Upon etching of the spacer 111, an ammonia-alkali etchant which has a pH value biased to the alkali side is used so that it may not etch any other metal film. Accordingly, the clearance between an outer circumferential face of the valve 54 and inner circumferential faces of the openings 103 and the nozzle 49 can be made uniform after the central portion of the spacer 111 has been removed. Further, since the substrate 100 is formed from a stainless steel plate while the nozzle plate 50 is made of nickel, they can be exfoliated readily from each other.

It is to be noted that while the process of producing the jetting control valve 47 described above does not include a step of forming the protective layer 56, the protective layer 56 is formed on a surface of the insulator layer 51 after completion of the second insulator layer forming step illustrated in FIGS. 23 and 24 before the spacer forming step illustrated in FIGS. 25 and 26. The protective layer 56 is formed by forming a ceramic material into a thin film by a thin film forming technique.

In this manner, the jetting control valve 47 can be produced finely with a high degree of accuracy by a thin film forming technique or photo-lithograph, and a jetting control valve array including a large number of such nozzles 49 can be produced with a high degree of density. Further, since such nozzles 49 can be formed as a unitary block, an adjusting operation and an assembling operation can be omitted.

Further, nickel which is used in this instance is plated using a non-glazing sulfamic acid nickel bath in which a glazing agent is not used. Thus, by raising the purity of deposited nickel, the corrosion resisting property against dyestuff steam, the heat resisting property, and the durability at a high temperature can be improved.

It is to be noted that the process of producing the jetting control valve 47 following the steps described above will be hereinafter referred to as a process consisting principally of photo-electroforming.

With such a construction as described above, as the heater 29 is energized, the sublimable dyestuff 30 within the dyestuff case 26 is heated to sublime into dyestuff steam. Then, as the coil 38 is energized, the piston 39 is moved to feed air within the cylinder 40 into the dyestuff case 26 via the inflow valve 42 and the filter 33 so that the pressurized dyestuff is supplied from the outflow port 44 into the flow path 46. In this instance, the pressurized gas is purified by the filter 33.

Then, as a predetermined voltage is applied between the electrode plate 52 and the valve beam 55 from the driving power source 79, an electrostatic force is applied to the valve beam 55 which is normally set in a position in which the valve 54 is spaced away from the nozzle 49 by an elastic force of the valve beam 55 itself so that the valve beam 55 is moved to a stand-by position in which it closes the nozzle 49 as shown in FIG. 34. This principle is quite the same as the principle described in an article entitled "Dynamic Micromechanics on Silicon: Techniques and Devices" by Kurt E. Patersen published in "IEEE Transactions on Electron Devices, VOL. ED-25, NO. 100, October 1978"' annexed to the documents of the present patent application. After such stand-by of the nozzle 49 in the closing condition, as the voltage between the electrode plate 52 and the valve beam 55 is controlled in response to a picture image signal by the switch 78, the valve 54 opens the nozzle 49 as shown in FIG. 33. Consequently, the pressurized dyestuff steam within the flow path 46 is jetted from the nozzle 49 to form a picture point on the record sheet 59. Thus, a character or figure is printed with a group of such picture points formed in this manner. Besides, in the present embodiment, since the jetting heads 45 are provided for the three colors of cyan, yellow and magenta, a color picture image 72 can be formed on the record sheet 59. Naturally, a continuous line can be printed by continuously jetting the dyestuff steam because there is relative movement between the nozzle 49 and the record paper 59 as a manner of printing.

Now, a condition for the valve 54 to close the nozzle 49, a condition for the valve 54 to open the nozzle 49, and a natural frequency fb of the valve beam 55 will be described. Here, $\epsilon_0$ : dielectric constant of vacuum
V : voltage applied between valve beam 55 and electrode plate 52
$\delta$: density of valve beam 55
E : Young's modulus of valve beam 55
l : length of valve beam 55
w : width of valve beam 55
t : thickness of valve beam 55
D : diameter of nozzle 49
I : second movement of area of valve beam 55
P : difference in pressure between inside and outside of jetting head 45

It is to be noted that a following equation stands here.

$$I = \frac{wt^3}{12}$$

At first, a condition for the valve 54 to close the nozzle 49 is provided by a following expression:

$$\frac{\epsilon_0 l\, w\, V^2}{2\, d^2} > \frac{384\, E\, I\, d}{l^3} \qquad (1)$$

Meanwhile, a condition for the valve 54 to open the nozzle 49 is provided by a following expression:

$$\frac{\pi D^2\, P}{4} < \frac{192\, E\, I\, d}{l^3} \qquad (2)$$

Further, a natural frequncy fb of the valve beam 55 is provided by a following expression:

$$fb = \frac{(4.73)^2}{2\pi l^2} \sqrt{\frac{E\, I}{\rho w\, t}} \text{ (Hz)} \qquad (3)$$

Accordingly, dimensions of the individual portions are determined so that values thereof may meet the conditions of the expressions (1) and (2) above and a desired frequency fb may be provided in accordance with the equation (3) above.

Here, under the condition of $$\epsilon_0 = 8{,}854 \times 10^{-12} \text{ (F/m)}$$

for example, following values were set:

$V = 300$ (V)
$E = 2.1 \times 10^{11}$ (Pa)
$\rho = 8902$ (kg/m$^3$)
$l = 4.0 \times 10^{-3}$ (m)
$w = 200 \times 10^{-6}$ (m)
$t = 10 \times 10^{-6}$ (m)
$D = 50 \times 10^{-6}$ (m)
$P = 1000$ (Pa)

Those values were substituted into the expressions (1), (2) and (3) above. Thus, a condition for the valve 54 to close the nozzle 49, that is, the expression (1) becomes $7.969\times10^{-4}>4.2\times10^{-4}$ while a condition for the valve 54 to open the nozzle 49, that is, the expression (2) becomes $$1.963\times10^{-6}<2.1\times10^{-4}$$

Accordingly, it can be seen that the above listed values meet the two conditions. Further, a natural frequency fb of the valve beam 55 is calculated in accordance with the equation (3) above. thus, $$fb=3.12\times10^{3}\ (Hz)$$

However, it is apparently seen from the equation (3) that the natural frequency fb of the valve beam 55 can be readily set by changing the shape, dimensions and components of the valve beam 55. Accordingly, driving of the valve beam 55 at a high frequency can be realized readily by setting dimensions and so on of the valve beam 55 in accordance with the equation (3) above. Consequently, printing at a high speed can be attained by opening and closing of the valve 54 at a high speed. Further, control of the opening and closing times of the valve 54 at more than 2 stages is enabled without a considerable delay of the printing speed, and picture points can be indicated in multi-stages. Consequently, a picture image 72 of a color near to a natual color can be attained together with a high color developing property of sublimable dyestuff 30.

Meanwhile, it is apparent from the expressions (1) and (2) that if the voltage V applied between the electrode plate 52 and the valve beam 55 changes, also the amount of movement of the valve 54 changes. Therefore, by controlling the applied voltage V, it is possible to suitably control the amount of movement of the valve 54 to adjust the degree of opening of the nozzle 49 to effect control of the flow rate of dyestuff steam to be jetted.

Further, in the pressurizing pump 34, the coil 38 is held in a normally energized condition so that the piston 39 may be normally acted upon by a fixed electromagnetic force. Consequently, the pressure of the dyestuff steam within the flow path 46 is maintained constant whether the nozzles 49 are open or closed. Particularly, when the flow path 46 is set to have a somewhat great volume as in the present embodiment, the fixed pressure of the dyestuff steam is maintained more effectively. Theoretically, the pressure of the dyestuff steam at the nozzles 49 is maintained constant without fail if the flow path 46 which communicates with all of the nozzles 49 is provided. Actually, however, the theory cannot apply strictly because the nozzles 49 are opened and closed at a high speed or by some other reasons. Thus, if the volume of the flow path 46 is great to some degree as in the present embodiment, the pressure within the flow path 46 is not influenced very much by jetting of the dyestuff steam by opening and closing of the nozzles 49, which contributes to maintenance of the constant pressure condition.

It is to be noted that, when the main power source is to be interrupted to stop printing, the magnet valve 43 is opened to allow the pressurized dyestuff steam within the flow path 46 and the dyestuff case 26 to flow back to stick to the filter 33, and when the pressure of the dyestuff steam is dropped, the application of the voltage between the electrode plate 52 and the valve beam 55 is stopped. Consequently, there is no outflow of the dyestuff steam from the nozzle 49, Further, since the sublimable dyestuff 40 sticking to various portions will sublime again if it receives heat by some heating means, it can be used again amd will not cause choking at a communicating portion.

Further, by the presence of production of the jetting control valve 47 consisting principally of photo-electroforming, the nozzles 49, valves 54 and so on can be readily produced finely with a high degree of accuracy, and a color picture image of the equal quality to that of a conventional silver salt photograph can be obtained together with the aforementioned multi-stages.

In the meantime, from another point of view, since an article having a large number of equivalent nozzles 49 can be produced readily by a thin film forming technique, elongation of a nozzle array can be made readily, and an increase of the area of a picture image to be obtained is enabled.

In addition, since the electrode plate 52 is embedded in the insulator layer 51, it is held in an isolated condition from the valve 54 and the pressurized dyestuff steam which presents a high pressure at a high temperature. Accordingly, the deterioration of the electrode plate 52 is little and the electrode plate 52 is superior in durability in use for a long period of time.

It is to be noted that while the gas utilized for pressurization is described to be air in the present embodiment, any other gas which is ready to form a picture point on the record sheet 59 if it is combined with the record sheet 59 and the sublimable dyestuff 30 such as, for example, steam of ethyl alcohol, a benzoic acid or the like.

Figure 35:
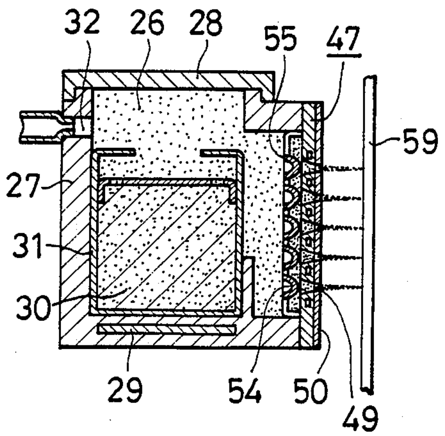
FIG. 35 is a vertical sectional side elevational view of a printing device showing a second embodiment of the present invention.
Figure 36:
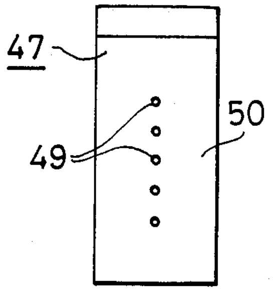
FIG. 36 is a front elevational view of the printing device of FIG. 35.

Now, a second preferred embodiment of the present invention will be described with reference to FIGS. 35 and 36. A printing device of the present invention has a construction suitable for a so-called serial head wherein the direction of movement of a jetting head 45 makes a main scanning direction while the direction of movement of a record sheet 59 makes an auxiliary scanning direction, and a nozzle array for forming a picture image extends in a direction perpendicular to the main scanning direction, and wherein a jetting control nozzle 47 is directly mounted on a dyestuff case 26. Accordingly, a spacing within the dyestuff case 26 makes a flow path 46 for dyestuff steam. Construction of the remaining part of the printing device is quite similar to that of the first embodiment described hereinabove.

With such a construction, jetting of dyestuff steam from a nozzle 49 is controlled by movement of a valve beam 55 to print a character or figure. In this instance, although the valve beam 55 is located within the dyestuff case 26, since heat is transmitted from a heater 29 to a nozzle plate 50 made of nickel so that the temperature of the nozzle plate 50 is raised, there is no possibility that the sublimable dyestuff 40 may stick to a portion around the nozzle 49 to cause choking of the nozzle 49 portion. Further, if choking should be caused at the nozzle 49 portion by sticking thereto of the sublimable dyestuff 30, energization of the heater 29 upon starting of re-use of the printing device will cause sublimation of the sticking sublimable dyestuff 30, and hence the printing device will not substantially suffer from choking.

Figure 37:
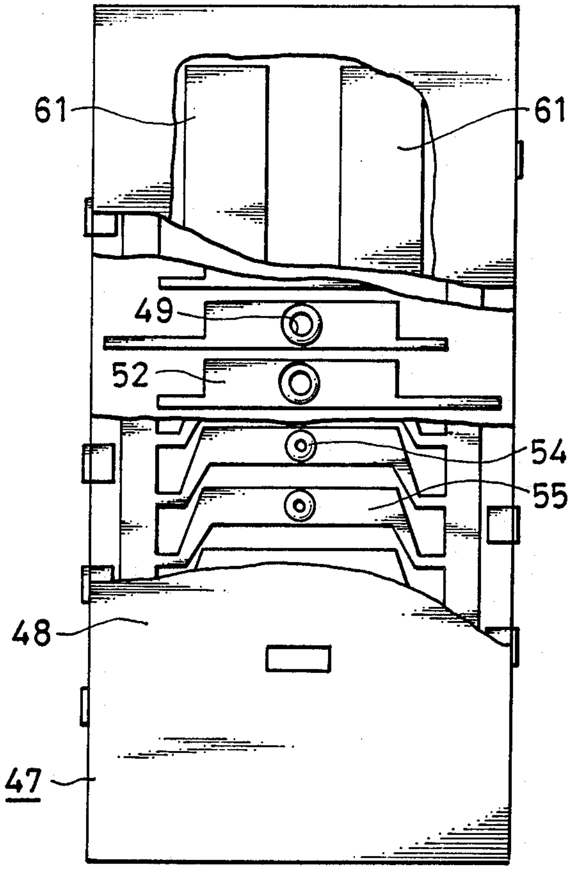
FIG. 37 is a plan view of a printing device, partly broken, showing a third embodiment of the present invention.
Figure 38:
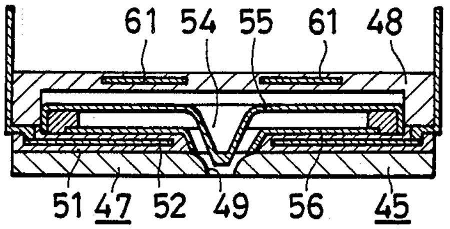
FIG. 38 is a vertical sectional side elevational view of the printing device of FIG. 37.

Subsequently, a third preferred embodiment of the present invention will be described with reference to FIGS. 37 and 38. It is to be noted that like parts or components are denoted by like reference numerals to those of the first embodiment, and overlapping description of the same will be omitted herein (this also applies to the following embodiments described hereinbelow). A printing device of the present embodiment has a construction suitable for a so-called line head wherein a nozzle array extends in a direction perpendicular to the direction of movement of a record sheet 59. A pair of heaters 61 in the form of strings serving as a choking preventing heating means are mounted in a vessel 48 and extend in a longitudinal direction of the vessel 48.

Accordingly, the heaters 61 will heat over the entire length of the vessel 48 to maintain a uniform temperature over an entire jetting head 45, thereby preventing solidification of dyestuff steam and choking of portions around nozzles 49 caused by sticking of the dyestuff to the portions. Accordingly, it is made possible to elongate the jetting head 45.

It is to be noted that where the vessel 48 is made of a ceramic or plastic material, the heaters 61 can be mounted in the vessel 48 in an integral relationship by molding, or where thick film printing is available, a resistor element can be printed in a pattern for use as a heating means. The latter means may be employed even where the vessel 48 is made of a metal material, and by the means, the number of parts can be reduced by integration of the vessel 48 and the heaters 61.

Figure 39:
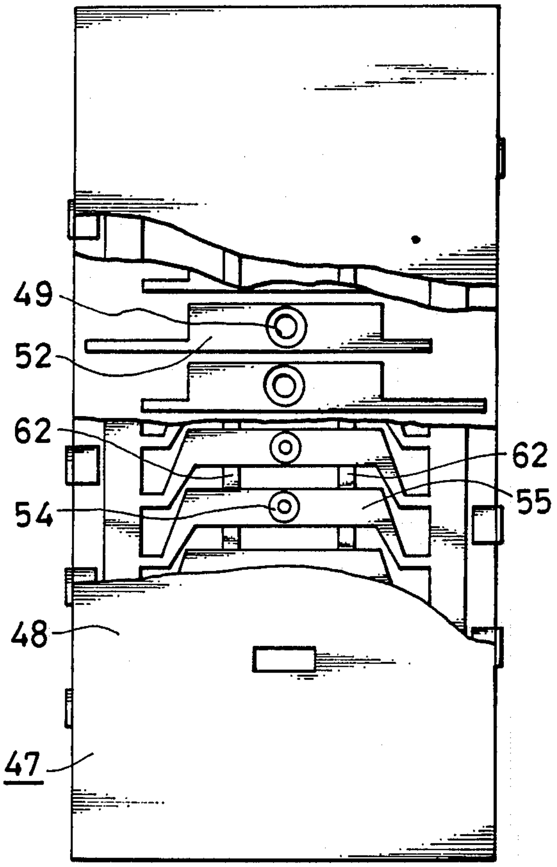
FIG. 39 is a plan view of a printing device, partly broken, showing a fourth embodiment of the present invention.
Figure 40:
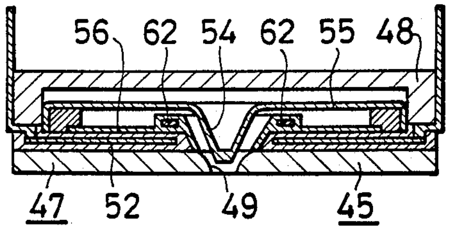
FIG. 40 is a vertical sectional side elevational view of the printing device of FIG. 39.

Now, a fourth embodiment of the present invention will be described with reference to FIGS. 39 and 40. A printing device of the present invention is designed to prevent choking of a line head similarly as in the third embodiment described above, and a heat generating member 62 serving as a choking preventing heating means is layered in an integral relationship on a nozzle plate 50 of a jetting control valve 47 and is energized when printing is to be effected. In this instance, since the heat generating member 62 can be provided around nozzles 49, the efficiency in prevention of choking of the heating means is improved comparing with the third embodiment described above.

Further, the heat generating member 62 is produced with a high degree of accuracy without complicating the production procedure because only a heat generating member layering step must be added to a layering step for the jetting control valve 47. It is to be noted that the location at which the heat generating member 62 is formed is not limited to such a location as shown in FIGS. 39 and 40 and may otherwise be a location, for example, on a surface of the nozzle plate 50 or between the nozzle plate 50 and an insulator layer 51.

Figure 2:
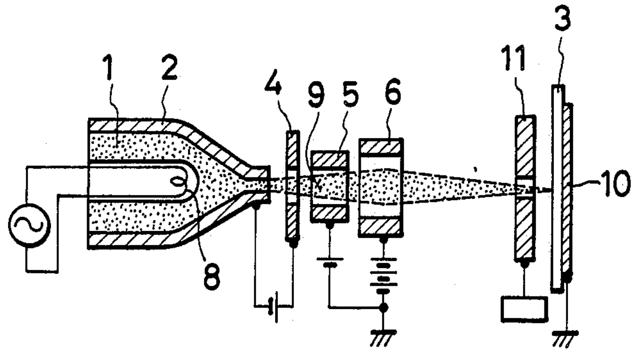
FIG. 2 PRIOR ART
FIG. 2 is a vertical sectional side elevational view showing another exemplary one of conventional printing devices.
Figure 3:
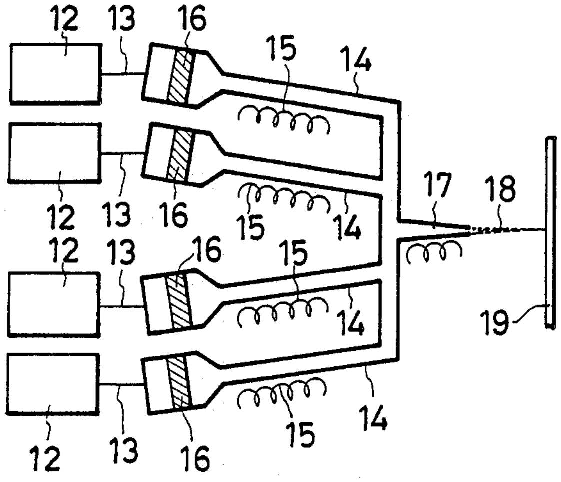
FIG.3 PRIOR ART
FIG. 3 is a plan view showing a further exemplary one of conventional printing devices.
Figure 4:
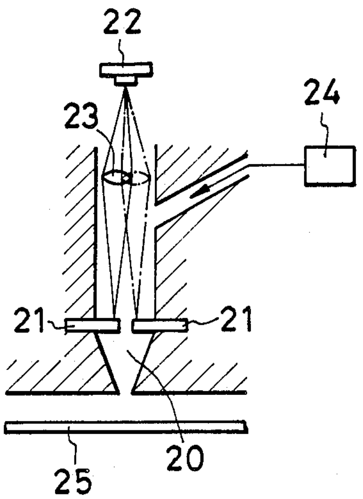
FIG.4 PRIOR ART
FIG. 4 is a vertical sectional side elevational views showing a still another exemplary one of conventional printing devices.
Figure 5:
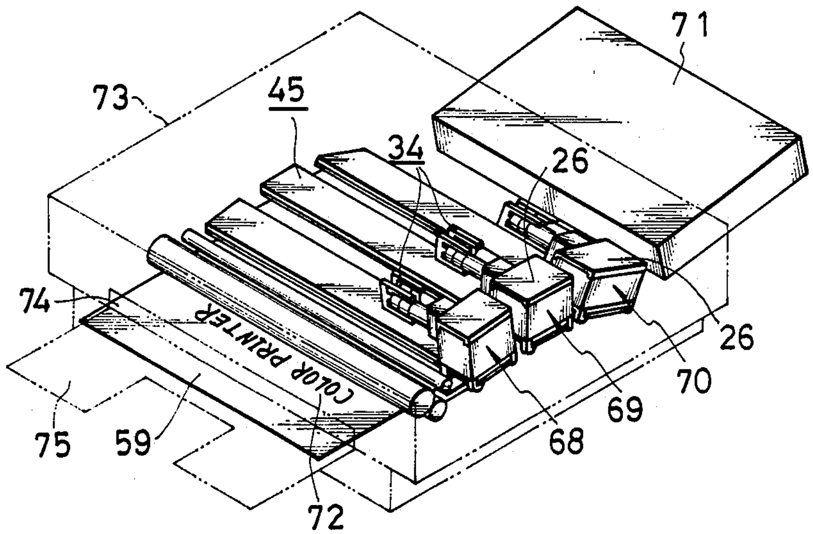
FIG. 5 is a perspective view of an entire printing device showing a first embodiment of the present invention.
Figure 6:
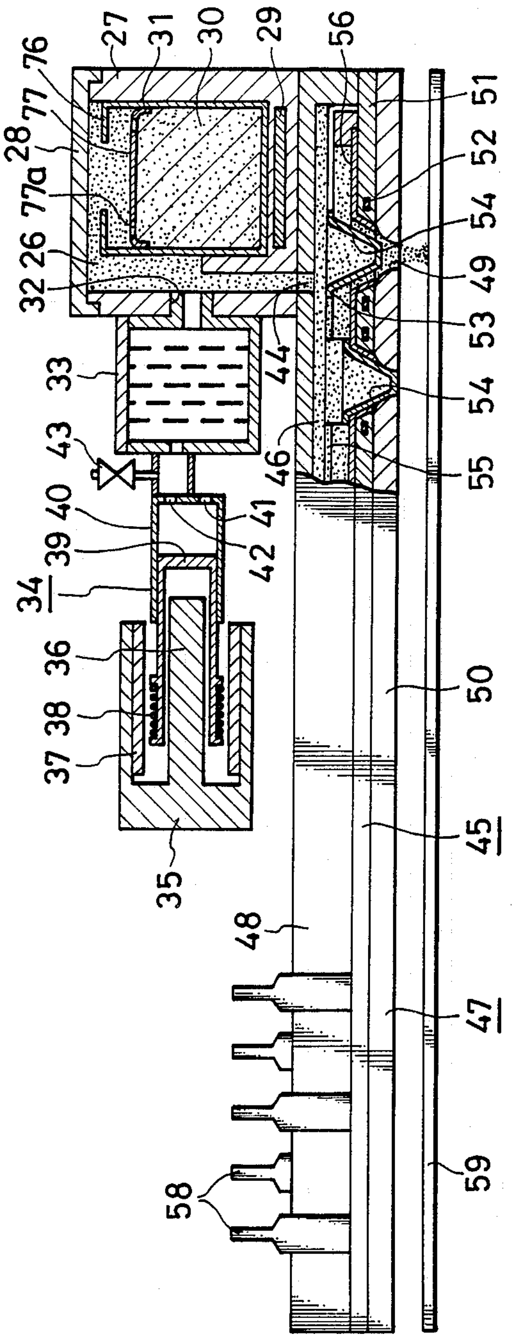
FIG. 6 is a vertical sectional front elevational view of a jetting head.
Figure 7:
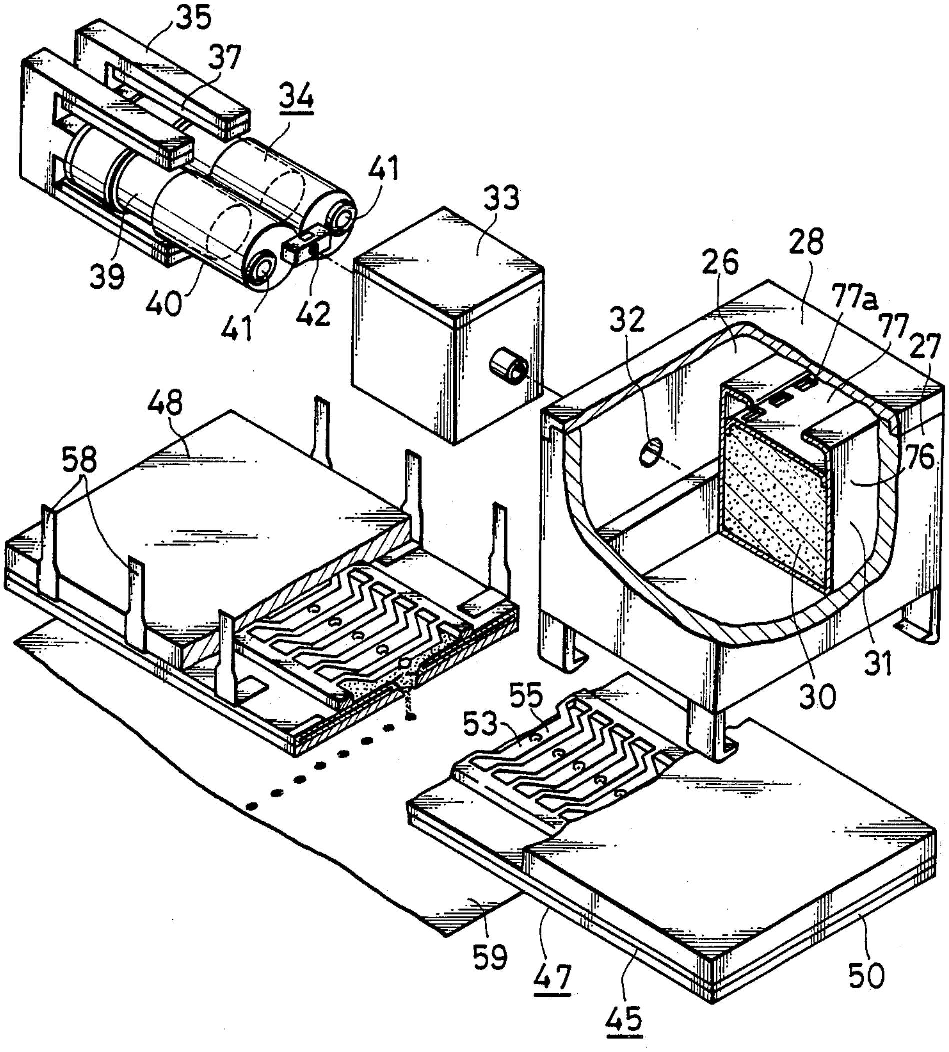
FIG. 7 is a fragmentary perspective view of the jetting head of FIG. 6.
Figure 8:
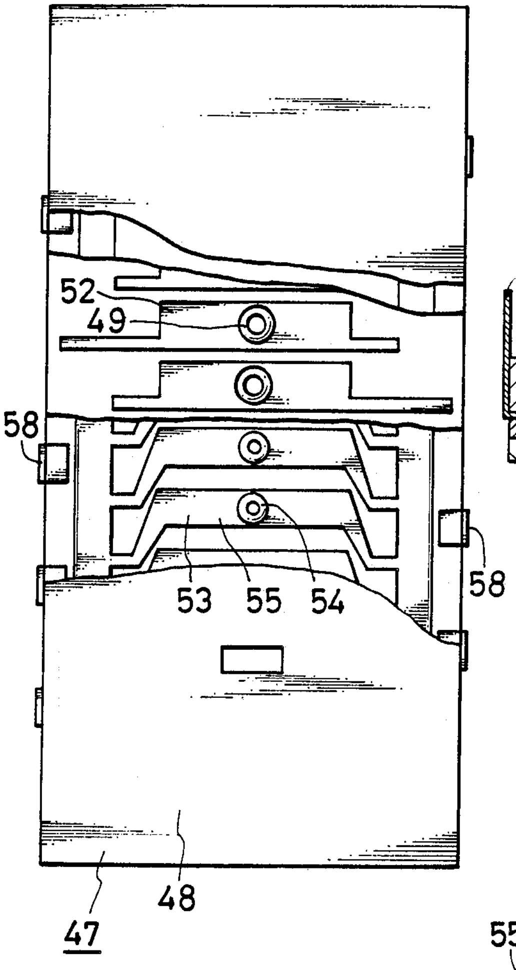
FIG. 8 is a plan view, partly broken, of the jetting head of FIG. 6.
Figure 9:
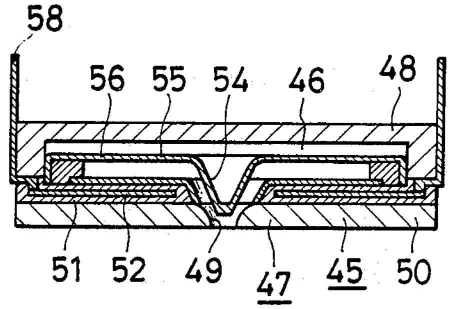
FIG. 9 is a vertical sectional side elevational view of the jetting head of FIG. 8.
Figure 10:
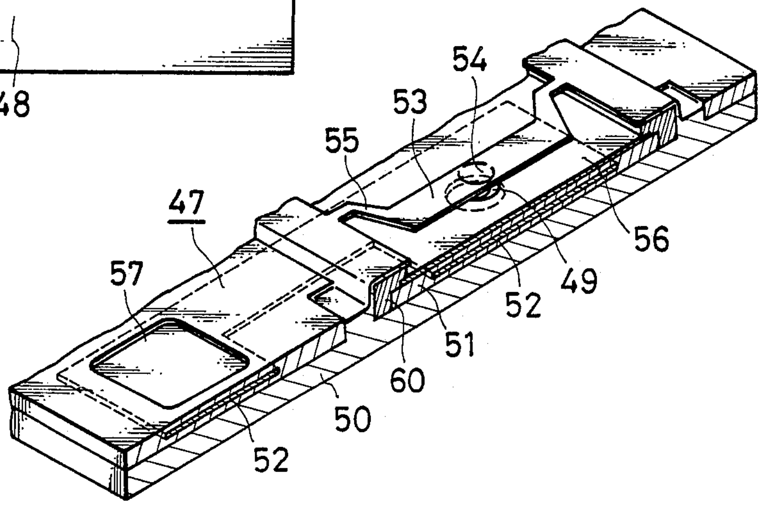
FIG. 10 is a perspective view of part of the jetting head of FIG. 8.
Figure 41:
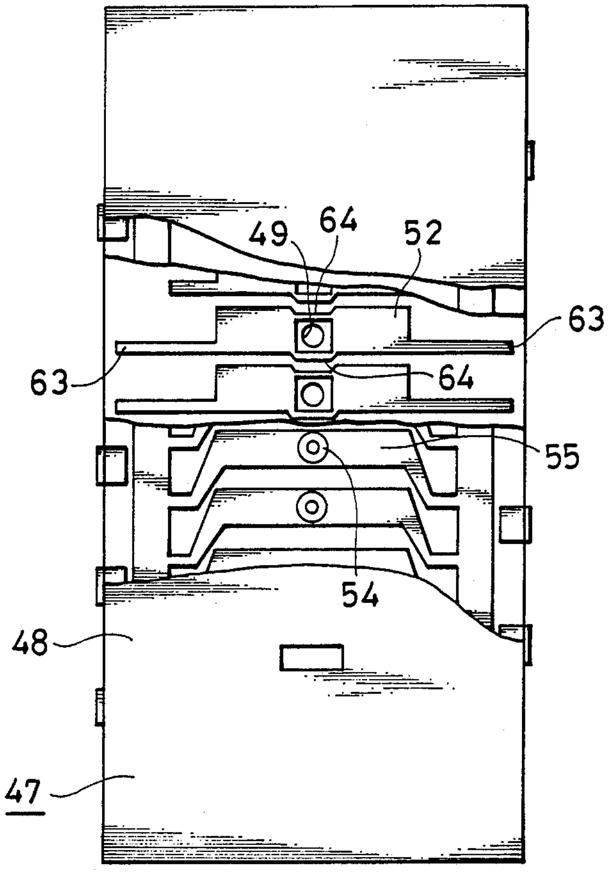
FIG. 41 is a plan view of a printing device, partly broken, showing a fifth embodiment of the present invention.
Figure 42:
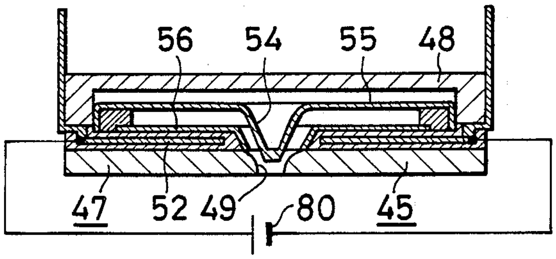
FIG. 42 is a vertical sectional side elevational view of the printing device of FIG. 41.

A fifth preferred embodiment of the present invention will now be described with reference to FIGS. 41 and 2. A printing device of the present embodiment is designed such that an electrode plate 52 is utilized as a heat generating member. In particular, the opposite ends of the electrode plate 52 are connected as terminals 63 to a heating power source 80, and the width of an outer periphery of a nozzle 49 is reduced to form a heat generating portion 64 as a choking preventing heating means in order to improve the efficiency in generation of heat. More particularly, a portion of the electrode plate 52 opposing to the nozzle 49 is removed in the shape of a regular square to make a thin material shape wherein a narrow portion is elongated to reduce the area of an outer periphery of the nozzle 49 to form a heat generating portion 64. By the construction, the electric resistance is increased at the outer periphery of the nozzle 49 so that the nozzle 49 functions as a heat generating member. In this instance, since nickel has a comparatively high specific resistance, it can be used satisfactorily as the heat generating member 64 and can be reduced to practice without changing the process of production of the jetting control valve 47. Further, where higher heat generation is required, the entirety or part of the electrode plate 52 may be formed from a separate resistor element.

It is an important point in the present embodiment that while a predetermined voltage is applied to the electrode plate 52 in order to flow electric current required for generation of heat therethrough, the voltage must be of a value of such a degree that it will not have a influence on movement of the valve beam 55. Opening and closing movement of the nozzle 49 is effected in such a manner as described hereinabove by application of a voltage in response to a picture image signal.

Figure 43:
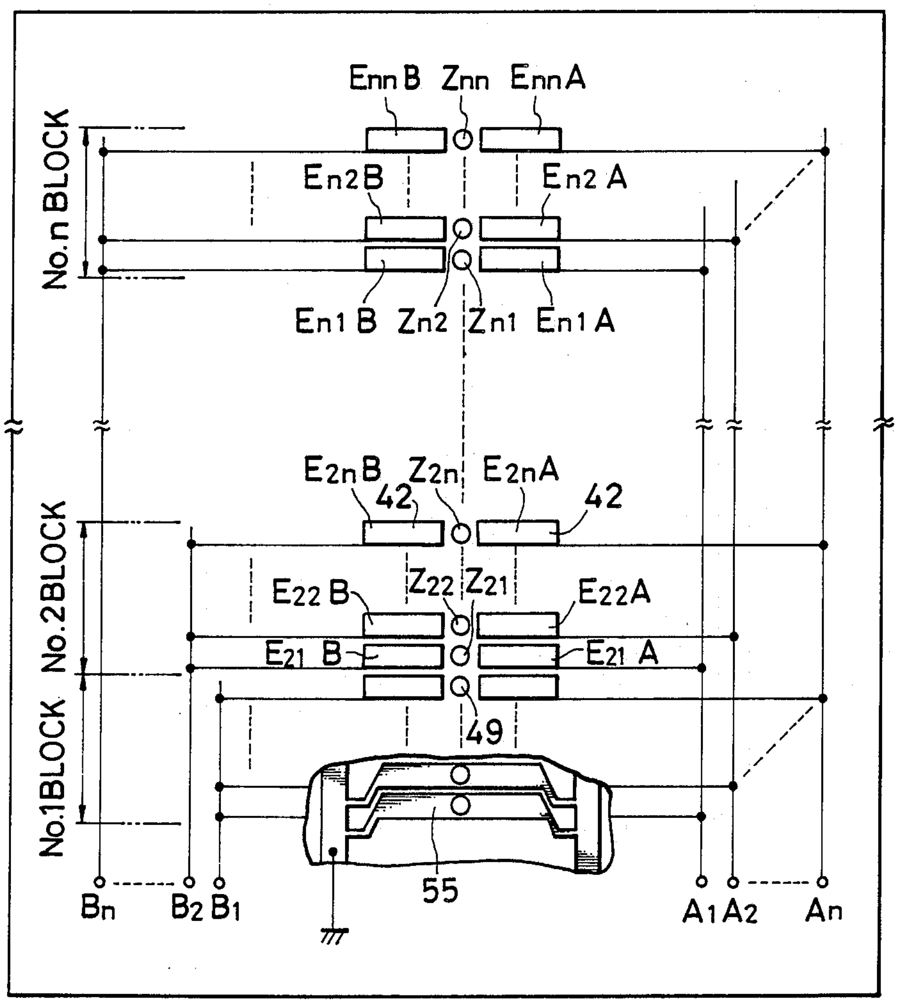
FIG. 43 is a plan view of a printing device, partly broken, showing a sixth embodiment of the present invention.

A sixth preferred embodiment of the present invention will be described below with reference to FIG. 43. A printing device of the present invention is designed to cope with elongation of a line head and enables reduction of the number of terminals by a matrix wiring. At first, an electrode plate 52 corresponding to a nozzle array is divided into first to nth blocks each including n nozzles 49. The electrode plate 52 corresponding to a single nozzle 49 and a valve beam 55 includes a pair of electrode plates 52 which are isolated from each other. Matrix wirings $A_1$, $A_2$, $A_3$, . . . , and $A_n$ for applying a voltage at a time to the electrode plates 52 on one side one for each block while common connecting lines $B_1$, $B_2$, $B_3$, . . . , and $B_n$ are connected to the electrode plates 52 on the other side for the individual blocks.

With such a construction as described above, when, for example, the nozzle $Z_{21}$ of the second block is to be opened, the voltage applied between the terminal $B_2$ and the terminal $A_1$ is canceled to cause restoration of the valve beam 55 for the nozzle $Z_{21}$ to open the nozzle $Z_{21}$. In this case, the valve beam 55 is grounded, and the voltage is applied to the electrode 52 side. Thereupon, since the voltage is canceled at $E_{21}A$ and $E_{21}B$ of the electrode plates 52, the nozzle $Z_{21}$ is opened, but the nozzle 49 will not be opened because the voltage is applied to $E_{22}A$, $E_{23}A$, . . . , and $E_2n$. Accordingly, in the case of the present embodiment, it is necessary for the valve beam 55 to be deformed sufficiently to close the nozzle 49 only by application of the voltage to the electrode plate 52 on one side. In this manner, scanning in opening and closing of the nozzles are performed for the individual blocks. Accordingly, opening and closing of a total number of $n_2$ nozzles 49 can be controlled with a total number of 2n terminals, thereby enabling elongation and increase in density of a nozzle train.

Figure 44:
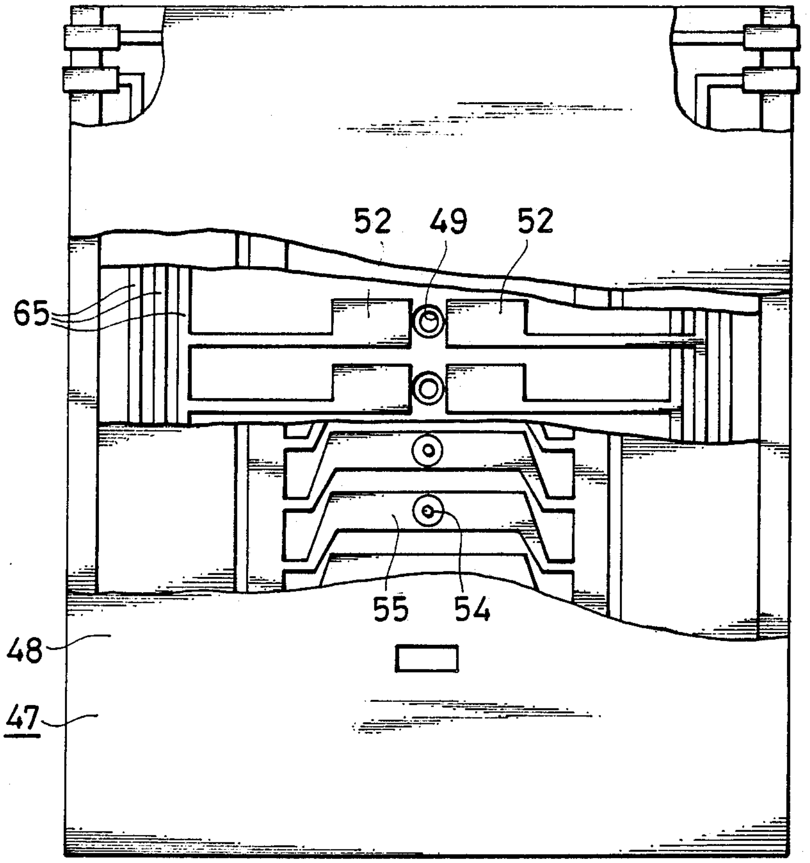
FIG. 44 is a plan view of a printing device, partly broken, showing a seventh embodiment of the present invention.
Figure 45:
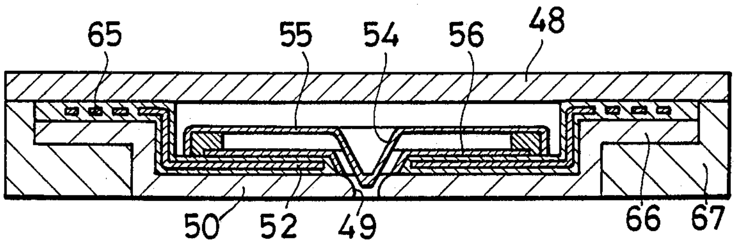
FIG. 45 is a vertical sectional side elevational view of the printing device of FIG. 44.

A seventh preferred embodiment of the present invention will be described with reference to FIGS. 44 and 45. A printing device of the present invention is constituted such that a vessel 48 is formed in a flattened configuration and a nozzle plate 50 is secured to a face of the vessel 48 with each of the opposite sides thereof except valve beam 55 bent into a crank-like shape. Lead wire portions 65 are provided on such bent portions 66 of the nozzle plate 50. A pair of closing up members 67 are provided on the opposite sides of the nozzle plate 50.

Since a projected portion of the nozzle plate 50 is formed only at an intermediate portion, the area exposed to the external air can be reduced, thereby preventing heat from escaping to the external air. In addition to such a heat insulating effect, reduction in size of a jetting head 45, increase in strength of the nozzle plate 50, improvement in closing up performance and so on are enabled.

What is claimed is:

1. A printing device, comprising:

a dyestuff case defining a dyestuff chamber for containing a sublimable dyestuff therein;

a heating means for heating the sublimable dyestuff to sublime to form steam of the dyestuff;

a pressurizing means for flowing gas into the dyestuff steam to pressurize the dyestuff steam to form pressurized dyestuff steam;

a nozzle plate communicating in a closing up relationship with said dyestuff case and having a nozzle formed therein for jetting the pressurized dyestuff steam toward a record medium;

a valve disposed in an opposing relationship to said nozzle for opening and closing said nozzle;

a valve beam having a deformable portion which carries said valve thereon and moves, when deformed, said valve into or out of contact with said nozzle; and an electrode plate located in an opposing relationship to said valve and in an isolated relationship from said valve and the pressurized dyestuff steam for providing a difference in potential with reference to said valve to produce an electrostatic force relative to said valve to displace said valve toward said nozzle.

2. A printing device according to claim 1, further comprising a plurality of jetting heads having sublimable dyestuffs of different colors therein, the sublimable dyestuffs of the different colors being selectively jetted to effect color printing.

3. A printing device according to claim 1, wherein said nozzle plate and said valve beam are provided on a side wall of said dyestuff case.

4. A printing device according to claim 3, wherein a plurality of nozzles and a plurality of valves are provided to form a jetting head of the serial type.

5. A printing device according to claim 1, further comprising a vessel located on one side of said nozzle plate to cover said valve beam and communicating with said dyestuff chamber to define a flow path for introducing the pressurized dyestuff steam to said nozzle.

6. A printing device according to claim 5, further comprising a choking preventing heating means embedded in said vessel.

7. A printing device according to claim 1, wherein said heating means is a heater embedded in said dyestuff case.

8. A printing device according to claim 1, wherein the gas to be flowed into the dyestuff steam is air.

9. A printing device according to claim 1, wherein the gas to be flowed into the dyestuff steam is steam of ethyl alcohol.

10. A printing device according to claim 1, wherein the gas to be flowed into the dyestuff steam is steam of a benzoic acid.

11. A printing device according to claim 1, wherein said pressurizing means is an electromagnetic pump.

12. A printing device according to claim 1, wherein said pressurizing means and said dyestuff case are connected to each other via a filter.

13. A printing device according to claim 12, wherein a valve is interposed between said pressurizing means and said filter.

14. A printing device according to claim 13, wherein said valve is a magnet valve which is opened when the main power source for said printing device is turned off.

15. A printing device according to claim 1, wherein said nozzle plate and said valve beam are formed by photo-electroforming.

16. A printing device according to claim 15, wherein said electrode plate is embedded in an insulator layer formed on said nozzle plate.

17. A printing device according to claim 15, wherein a large number of nozzles and a large number of valves are disposed in an array.

18. A printing device according to claim 1, wherein said nozzle is formed into a tapering configuration wherein it tapers toward the jetting direction of the pressurized dyestuff steam.

19. A printing device according to claim 1, wherein said electrode is a heating member which serves also as a choking preventing heating means.

20. A printing device according to claim 1, wherein a portion of said electrode plate opposing to said nozzle is removed in a square shape while the remaining portion is formed in an elongated configuration so that it may serve as a heating member.

21. A printing device according to claim 1, wherein a choking preventing heating means is embedded in a portion of said nozzle plate around said nozzle.

22. A printing device according to claim 1, wherein said valve beam is driven with a high frequency.

23. A printing device according to claim 1, wherein said valve is opened once or a plurality of times to form a picture element which is represented in one of different stages.

* * * * *